United States Patent [19]

Heyn et al.

[11] Patent Number: 5,125,528

[45] Date of Patent: Jun. 30, 1992

[54] CONTAINER CLOSURE, AND METHOD FOR PRODUCING SAME

[75] Inventors: William M. Heyn, New Canaan; Donald J. Roth, Westport, both of Conn.

[73] Assignee: Polystar Packaging, Inc., Norwalk, Conn.

[21] Appl. No.: 451,812

[22] Filed: Dec. 18, 1989

[51] Int. Cl.⁵ .............................................. B65D 17/34
[52] U.S. Cl. .................... 220/269; 220/306; 220/359
[58] Field of Search ............... 220/254, 269, 270, 276, 220/359

[56] References Cited

U.S. PATENT DOCUMENTS

| | | |
|---|---|---|
| 3,437,227 | 4/1969 | Peyser . |
| 4,141,462 | 2/1979 | Rucci ................................. 220/254 |
| 4,155,481 | 5/1979 | Takahashi et al. .................. 220/270 |
| 4,190,174 | 2/1980 | Haimowitz ......................... 220/254 |
| 4,211,336 | 7/1980 | Helms ................................ 220/270 |
| 4,309,952 | 1/1982 | Takahashi et al. . |
| 4,441,624 | 4/1984 | Sokolowski ........................ 220/254 |
| 4,741,450 | 5/1988 | Braude ............................... 220/90.4 |
| 4,949,865 | 8/1990 | Turner ............................... 220/90.4 |

FOREIGN PATENT DOCUMENTS

| | | |
|---|---|---|
| 3222655 | 5/1983 | Denmark . |
| 2380196 | 8/1978 | France . |
| 1571391 | 7/1980 | United Kingdom . |

Primary Examiner—Stephen Marcus
Assistant Examiner—Nova Stucker
Attorney, Agent, or Firm—William H. Holt

[57] ABSTRACT

Closures for containers, such as cans and the like, wherein the closure is comprised of an end panel and a frame member which, preferably, are attached together during an insert-injection molding operation used for forming the frame member. Depending upon the respective materials, the attachment therebetween may comprise heat-bonding or adhesives, and the like. The various end panels have a displaceable panel portion for providing an opening in the closure to provide access to the product(s) within the container. The various panel portions are defined by weakening lines, perforations or cut lines in the end panel and molded runners for "repairing" and/or sealing weakened or lanced portions of the end panels. The molded runners provide beam strength for protecting against excessive bulging during autoclave or other sterilization processes and against buckling during vacuum processing.

8 Claims, 3 Drawing Sheets

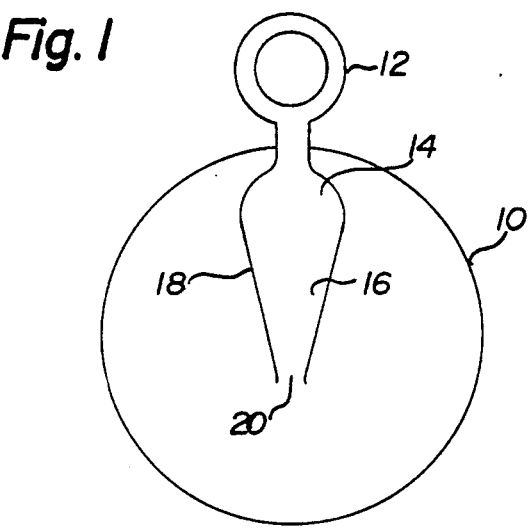
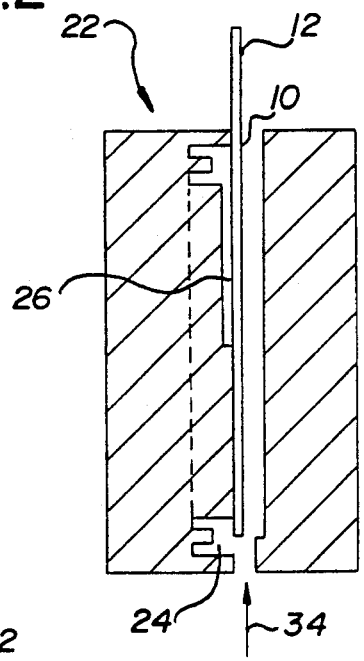
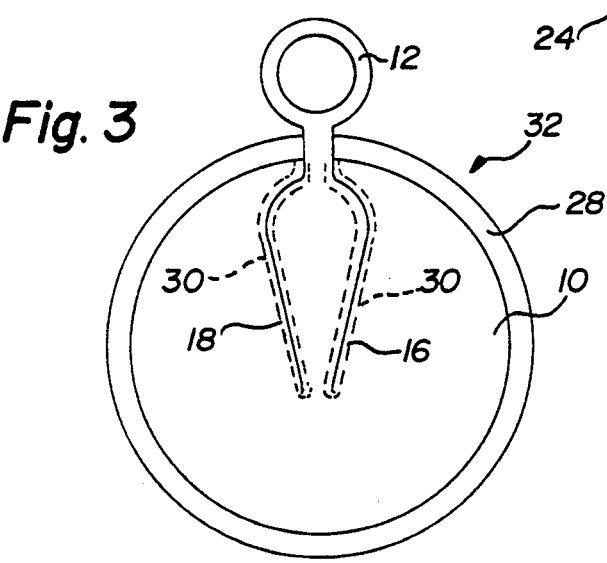
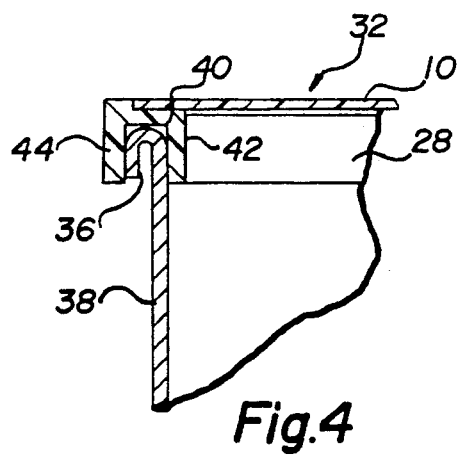
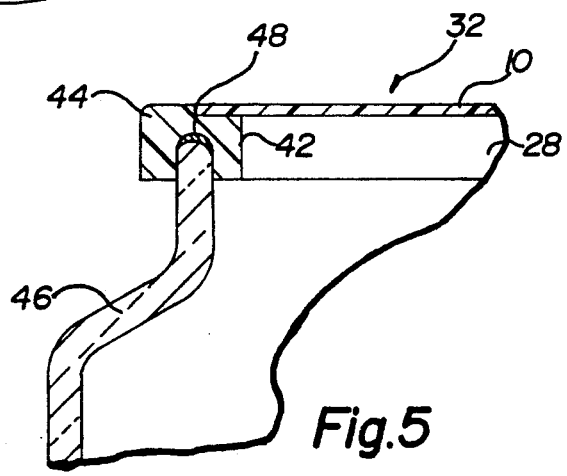

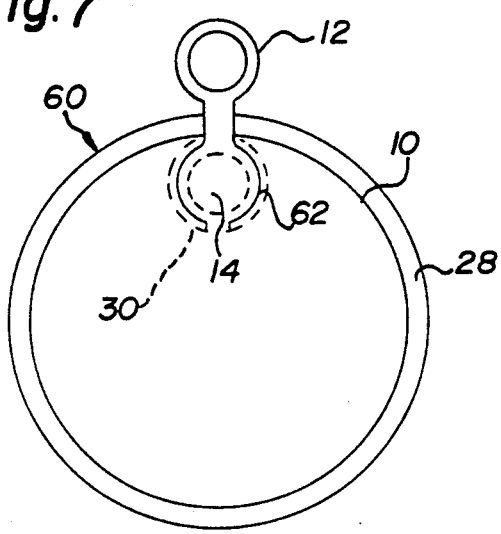
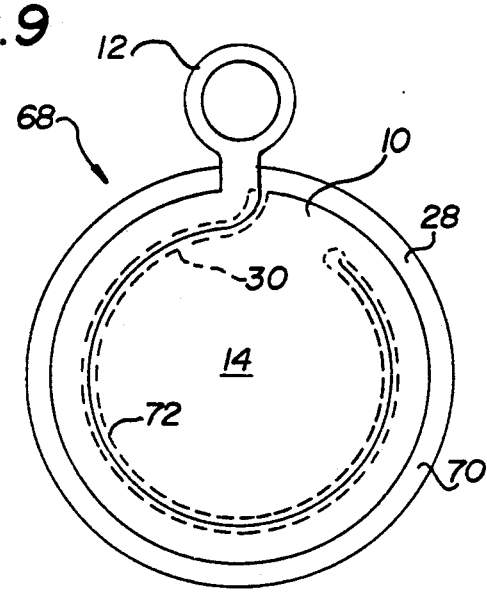
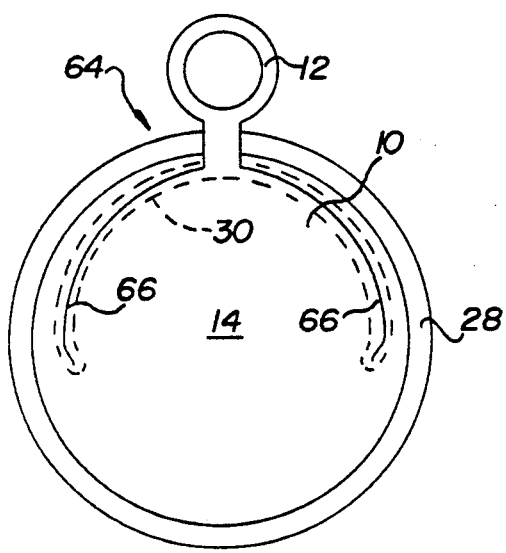
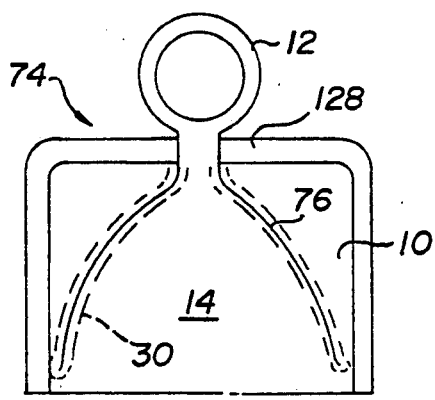
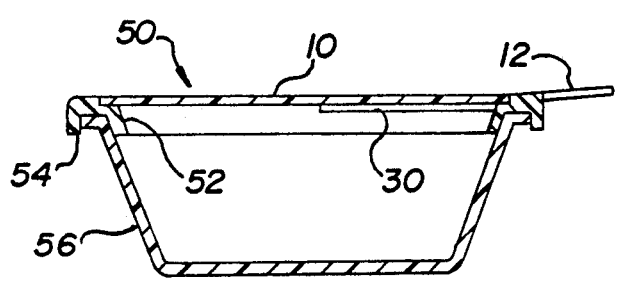

CONTAINER CLOSURE, AND METHOD FOR PRODUCING SAME

This invention relates to a closure for a container and, more particularly to a closure for food and beverage containers, and the like, and a novel method for producing the closure.

BACKGROUND OF THE INVENTION

It is conventional to provide food and beverage containers which are formed of metal and include a metal end panel usually double seamed to a tubular can body and having a score line, or line of weakening, formed in the end panel to define a removable panel portion in order to gain access to or dispense the product from the container. It is also conventional to affix a pull tab to the removable panel portion to afford the user with sufficient leverage to displace the panel either partially or completely from the remainder of the end panel. Devices of the type referred to are shown, for example, in U.S. Pat. Nos. 3,948,415, 3,972,445 and 4,802,603.

Further, it is also known to provide so-called easy-open container closures which are molded from plastic material such as shown, for example in U.S. Pat. Nos. 4,699,290 and 4,741,450, or container closures which are formed from a combination of metal and plastic such as in U.S. Pat. No. 4,130,218.

REFERENCE TO RELATED DISCLOSURE

In a related application, filed on even date herewith and identified as United States application Ser. No. 07/451,811 entitled CONTAINER CLOSURE, we have disclosed a container closure which includes a molded plastic frame member and an end panel secured thereto during an insert-injection molding process. The frame member is provided with means for securing it and the end panel to a container and the end panel is provided with a pull tab, or pull ring, for aiding the user to peel the end panel from at least a portion of the frame member.

SUMMARY OF THE PRESENT INVENTION

It is an object of the present invention to provide a closure for a container, the closure including a frame member and an end panel, means for attaching the end panel to the frame member, the frame member comprising an injection molded plastic ring member, means for securing the frame member and the end panel to a container, the end panel including a displaceable panel portion, means for displacing the displaceable panel portion from at least the remainder of the end panel and from the frame member for providing an opening in the closure.

It is a further object of the invention to provide a method of forming a container closure including the steps of forming an end panel in the shape of a planar disk; treating the end panel to define therein a displaceable panel portion; inserting the disk into a mold having a mold cavity for forming a frame member shaped to be secured to a container and also for forming an elongate runner member; and injecting plastic material into the mold cavity for forming the frame member and the elongate runner member and adhering the frame member and the elongate runner member to the planar disk.

A further object of the invention is to provide a closure of the type referred to above wherein the displaceable panel portion is defined by a weakening line in the end panel for outlining the displaceable panel portion, and a molded runner means adheres to the end panel and provides beam strength to the end panel.

A still further object of the invention is to provide a closure of the type referred to above wherein the displaceable panel portion is defined by a cut line formed completely through the thickness of the end panel for outlining the displaceable panel portion, and a molded runner means is formed adjacent to and conforming to the cut line for repairing the cut line and providing the end panel with structural integrity.

Further and various objects of the invention will be apparent from a consideration of the following brief description of the drawings and description of the preferred embodiments.

BRIEF DESCRIPTION OF THE DRAWINGS

FIG. 1 is a plan view of an end panel constructed in accordance with the present invention and shows the outline of a displaceable panel portion having a pull tab, or ring, attached thereto.

FIG. 2 is a fragmentary, sectional view of a mold, shown in slightly open position, containing an end panel therein in preparation for injecting plastic into the mold for forming a frame member in accordance with the invention.

FIG. 3 is a plan view of the molded plastic frame member and end panel produced from the mold of FIG. 2 and shows, in phantom, a molded runner member on the underside of and outlining the displaceable panel portion.

FIG. 4 is a fragmentary view, partly in section, and shows a frame member and end panel positioned for attachment to a metal can body.

FIG. 5 is a fragmentary view, partly in section and similar to FIG. 4, and shows a similar frame member and end panel affixed to the end of a glass container body.

FIG. 6 is a vertical, sectional view of a plastic container body having a slightly different frame member carrying an end panel and being connected to a hooked end, or flange, of the container body.

FIG. 7 is a plan view of a modified end panel wherein the displaceable panel portion is small and circular in shape for providing a small pour spout, or a small opening for receiving a drinking straw, or the like.

FIG. 8 is a top plan view of a modified frame member and end panel wherein the end panel has a lanced half-moon cut line which is repaired by a molded runner on the underside thereof.

FIG. 9 is a top plan view of a modified closure wherein the end panel is provided with a lanced swirl, or spiral, cut line having a molded runner on the underside thereof for repairing the cut line.

FIG. 10 is a top plan view of another form of closure wherein the frame member is designed to fit a rectangular container and the end panel includes a lanced cut line to provide a generally elliptical displaceable panel portion.

DESCRIPTION OF THE PREFERRED EMBODIMENTS

Figure 11:
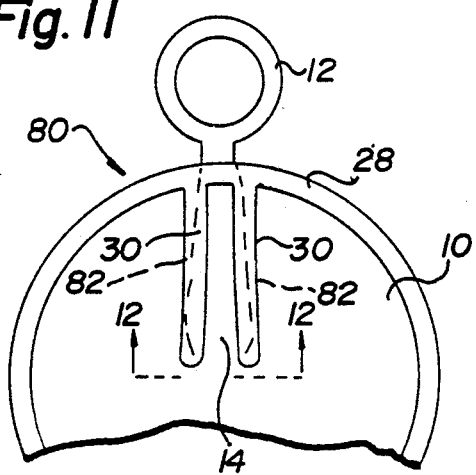
FIG. 11 is a fragmentary plan view of the underside of a closure, similar to the one shown in FIG. 3, and illustrates a pair of spaced runner members overlying perforated lines of weakening in the end panel for defining a displaceable panel portion.

A first embodiment of the invention is shown in FIGS. 1, 2 and 3 as including an end panel 10 being planar, or concave or convex in form and constructed, preferably, of a plastic material which has received U.S. Food and Drug Administration approval for use in connection with food and beverages. One suitable plastic material is polypropylene but other polyolefins may be used. Also, the end panel 10 could be formed from a multi-layer, co-extruded, high barrier plastic sheet which is die-cut so that end panel 10 is provided with an integrally formed pull tab or pull ring 12.

The end panel 10 includes a displaceable panel portion 14 which is shown in FIGS. 1 and 3 as being teardrop in shape and defined by lines 16 and 18. Lines 16 and 18 are, preferably, die cut and are considered to be "lines of weakening" albeit they may be perforated or lanced completely through the thickness of end panel 10. In FIG. 1, the lines 16 and 18 are spaced, at 20, so that panel portion 14 is not removed upon opening but, rather, remains attached to the remainder of end panel 10.

In accordance with the present invention, the end panel 10 is inserted into a split mold, generally indicated by the numeral 22 in FIG. 2, and, when mold 22 is closed upon the end panel 10, plastic material is injected into the cavities 24 and 26 for forming a ring-shaped frame member 28 and repair runners 30, both of which will be described in more detail. Suffice it to say for the moment that frame member 28 is bonded or adhered to end panel 10 and forms a closure member, generally indicated by the numeral 32 in FIG. 3. The plastic material for forming frame member 28 and repair runners 30 is injected into mold 22 through an injector depicted by arrow 34 in FIG. 2.

Referring to FIG. 4, the closure member 32, comprised of frame member 28 and end panel 10, is shown connected to a flange 36 of a metal can body 38. Adhesive material 40 may be placed between depending skirt portions 42 and 44, of frame member 28, and may be inductively heated while skirt 44 is compressed in order to hermetically seal closure 32 to can body 38 and, preferably, bury the raw edge of flange 36 within the skirt 44. Alternatively, adhesive material 40 may be omitted and frame member 28 can be formed of a suitable plastic which will, when inductively heated, adhere directly to the can body 38.

FIG. 5 is a showing similar to FIG. 4 except that closure 32 is secured to a non-metallic container 46 such as one formed of, for example, glass, plastic or the like. Adhesive material, indicated by the numeral 48, is provided between the container 46 and skirts 42 and 44 of closure 32. Adhesive 48 may contain inductive sensitive material, if so desired, for securing closure 32 to container 46.

In FIG. 6, a modified closure, generally indicated by the numeral 50, includes somewhat flared skirts 52 and 54, and is connected to a plastic package or container 56. Note also the extent of runner member 30 and the manner in which it underlies and strengthens end panel 10.

Various modifications of the invention are shown in FIGS. 1–15 wherein like numerals are used to depict similar parts such as the end panel 10, pull ring 12, displaceable panel portion 14 and molded frame member 28.

In FIG. 7, a closure 60 is provided with a lanced cut line 62 for providing a relatively small circular opening to receive, for example, a drinking straw (not shown).

In FIG. 8, a closure 64 has a displaceable panel portion defined by a half-moon formed by lanced cut line 66 which is sealed and strengthened by runner member 30.

FIG. 9 shows a closure 68 having a displaceable panel portion 70 which is defined by a spiral cut line 72.

FIG. 10 shows a closure 74 having a frame member 128 which is rectangular in plan, rather than circular like frame member(s) 28. Frame member 128 is provided with an elliptical lanced cut line 76 for defining the panel portion 14.

Figure 12:
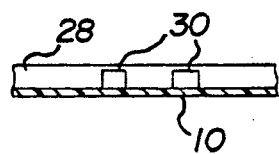
FIG. 12 is a fragmentary sectional view taken on line 12—12 of FIG. 11 and shows an end view of the pair of runner members.

FIGS. 11 and 12 show a modified closure 80 having perforated weakening lines 82 for defining the panel portion 14.

Figure 13:
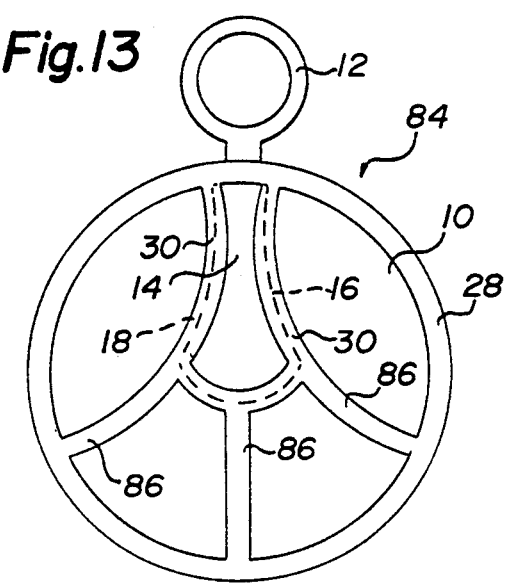
FIG. 13 is a plan view of the underside of a modified closure including a plurality of molded strengthening ribs, in addition to the repair runners for a teardrop shaped displaceable panel portion.

FIG. 13 shows a modified closure 84 wherein end panel 10 is provided, in addition to runner members 30, with a plurality of strengthening ribs 86 for providing beam strength to end panel 10 for restricting bulging or buckling thereof when the container is subjected to high pressure, either internal or external, such as occurs during retorting or vacuum operations.

Figure 14:
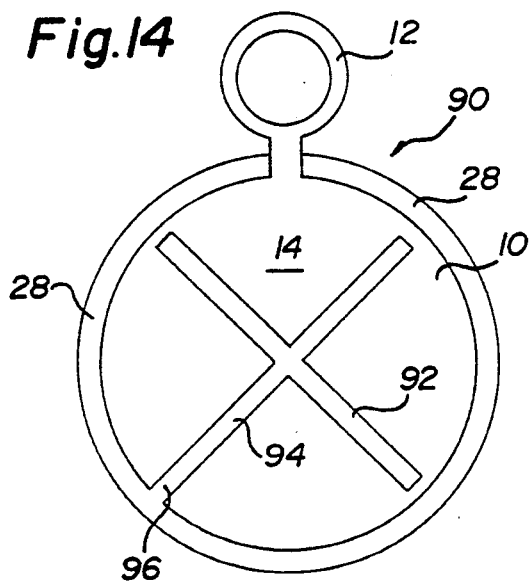
FIG. 14 is a top plan view of a modified closure wherein molded strengthening rib means are provided for the end panel and partially attached to the frame member for keeping the end panel from becoming detached therefrom.

FIG. 14 shows a modified closure 90 having strengthening ribs 92 and 94 secured to frame member 28, at 96, so that end panel 10 is secured to and does not pull free of frame member 28.

Figure 15:
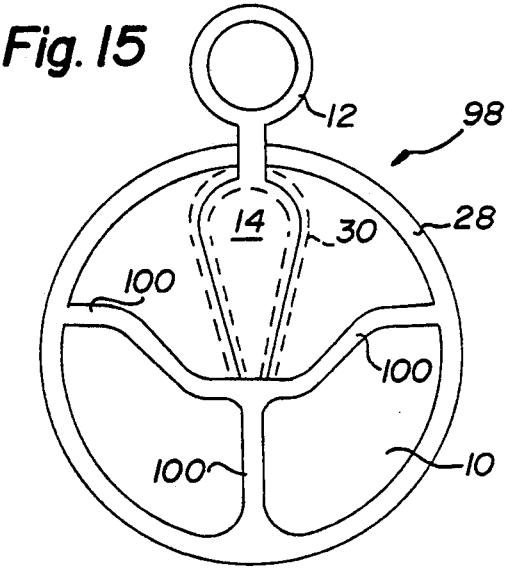
FIG. 15 is a top plan view of another form of closure wherein the end panel includes a lanced opening therein strengthening ribs on the top side of the end panel.

FIG. 15 shows a modified closure 98 having strengthening ribs 100 on the top side of end panel 10 so that closure 98 is ideally suited for use with pressurized drink containers, and the like.

Figure 16:
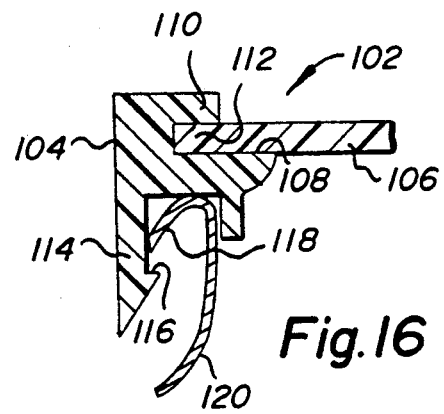
FIG. 16 is a fragmentary sectional view showing another embodiment of the invention in which a portion of the frame member overlays a marginal portion of the end panel.

FIG. 16 shows a modified closure, generally indicated by the numeral 102, including a frame member 104 and an end panel 106 which is supported upon a shelf 108 of frame member 104. In addition, frame member 104 includes an upper portion 110 which overlays a marginal portion 112 of end panel 106 to enhance the strength of closure 102 when the container is subjected to internal pressures which could cause the end panel 106 to bulge outwardly, or inwardly. Upper portion 110 may completely encircle the end panel 106, except for accommodating the pull tab or ring (for example, as is shown in FIGS. 7, 8 and 9), or the upper portion 110 may be intermittent and engage marginal portion 112 only at spaced intervals.

Further, frame member 104 includes a depending skirt 114 which is provided with a shelf portion 116 for capturing a flange 118, of a container 120, when the closure 102 is located, such as being snapped, upon container 120. This feature is useful during subsequent securing operations whether the attachment is accomplished through mechanical pressure, heat and pressure, or adhesives, or a combination thereof with heat and/or pressure.

The foregoing description and the accompanying drawings show and describe preferred forms of closures and methods of forming the same but it is to be understood that various changes and modifications can be made thereto without departing from the spirit and scope of the invention as defined by the appended claims.

I claim:

1. A closure for a container, said closure including an annular frame member and an end panel, means for attaching said end panel to said frame member along a periphery of said end panel, said frame member comprising an injection molded plastic ring member, means for securing said frame member and said end panel to a container along a periphery of said frame member, said end panel including a displaceable panel portion and a pull tab integrally formed and one piece with said displaceable panel portion and extending therefrom at a periphery of said frame member for displacing said displaceable panel portion from at least the remainder of said end panel and from said frame member for providing an opening in said closure, wherein said displaceable panel portion is defined by a continuous cut line formed completely through the thickness of said end panel for defining said displaceable panel portion, and molded runner means formed along the full extent of and bridging said cut line for sealing said cut line and providing said end panel with structural integrity, said molded runner means being injection molded along with said injection molded plastic ring member.

2. A closure as defined in claim 1 wherein said cut line defines said displaceable panel portion in the shape of a teardrop.

3. A closure as defined in claim 1 wherein said cut line defines said displaceable panel portion to be circular.

4. A closure as defined in claim 1 wherein said cut line defines said displaceable panel portion in the shape of a spiral.

5. A closure as defined in claim 1 wherein said cut line defines said displaceable panel portion in the shape of a half-moon.

6. A closure as defined i claim 1 wherein said cut line defines said displaceable panel portion to be at least partially elliptical.

7. A closure as defined in claim 1 wherein said molded runner means includes a portion thereof formed integrally with said ring member.

8. A closure for a container, said closure including an annular frame member and an end panel, means for attaching said end panel to said frame member along a periphery of said end panel, said annular frame member comprising an injection molded plastic ring member, means for securing said frame member and said end panel to a container along a periphery of said frame member, said end panel including a displaceable panel portion and a pull tab integrally formed and one piece with said displaceable panel portion and extending therefrom at a periphery of said frame member for displacing said displaceable panel portion from at least the remainder of said end panel and from said frame member for providing an opening in said closure, said frame member including injection molded strengthening means for overlaying a portion of said end panel for enhancing the strength of said closure when used with a container subjected to internal pressure, wherein said frame member includes a shelf for supporting said end panel, and said strengthening means for overlaying a portion of said end panel comprises an upper portion of said frame member which cooperates with said shelf for securing said end panel to said frame member.

* * * * *